United States Patent

[11] 3,592,373

| [72] | Inventors | Raymond W. H. Kim<br>Morton Grove;<br>Arthur E. Nupnau, Chicago, both of, Ill. |
|---|---|---|
| [21] | Appl. No. | 863,821 |
| [22] | Filed | Oct. 6, 1969 |
| [45] | Patented | July 13, 1971 |
| [73] | Assignee | Bell & Howell Company<br>Chicago, Ill. |

[54] VARIABLE-SPEED FILM MOVEMENT MECHANISM
12 Claims, 3 Drawing Figs.

| [52] | U.S. Cl. | 226/66 |
|---|---|---|
| [51] | Int. Cl. | G03b 1/28 |
| [50] | Field of Search | 226/64, 65, 66; 352/79, 180, 194, 196 |

[56] References Cited
UNITED STATES PATENTS

| 3,025,753 | 3/1962 | Rodgers et al. | 352/180 |
| 3,181,174 | 4/1965 | Griffioen et al. | 352/180 |
| 3,212,840 | 10/1965 | Roman et al. | 226/64 |
| 3,261,654 | 7/1966 | Faber et al. | 352/180 |
| 3,481,662 | 12/1969 | Procop | 352/194 |

*Primary Examiner*—Allen N. Knowles
*Attorneys*—William F. Pinsak and David Manly Heller ABSTRACT: A variable-speed film movement mechanism for a motion picture projector is provided wherein a shuttle, adapted to move the film across the projection axis, is moved into and out of engagement with the film perforations at speeds that are related to, but may be different from, the rate of up-and-down movement of that shuttle. The mechanism includes a shaft having mounted thereon an up-and-down cam adapted to move the shuttle cyclically up and down at a predetermined rate, and a normal cam operatively connected to move the shuttle in and out of film engagement in synchronism with the movement of the shuttle. A control mechanism is adjustable to enable selection of other cams and mechanism to cancel selected actuations of the normal cam and to provide rates of film movement at slow motion and very slow or stop motion in addition to normal motion.

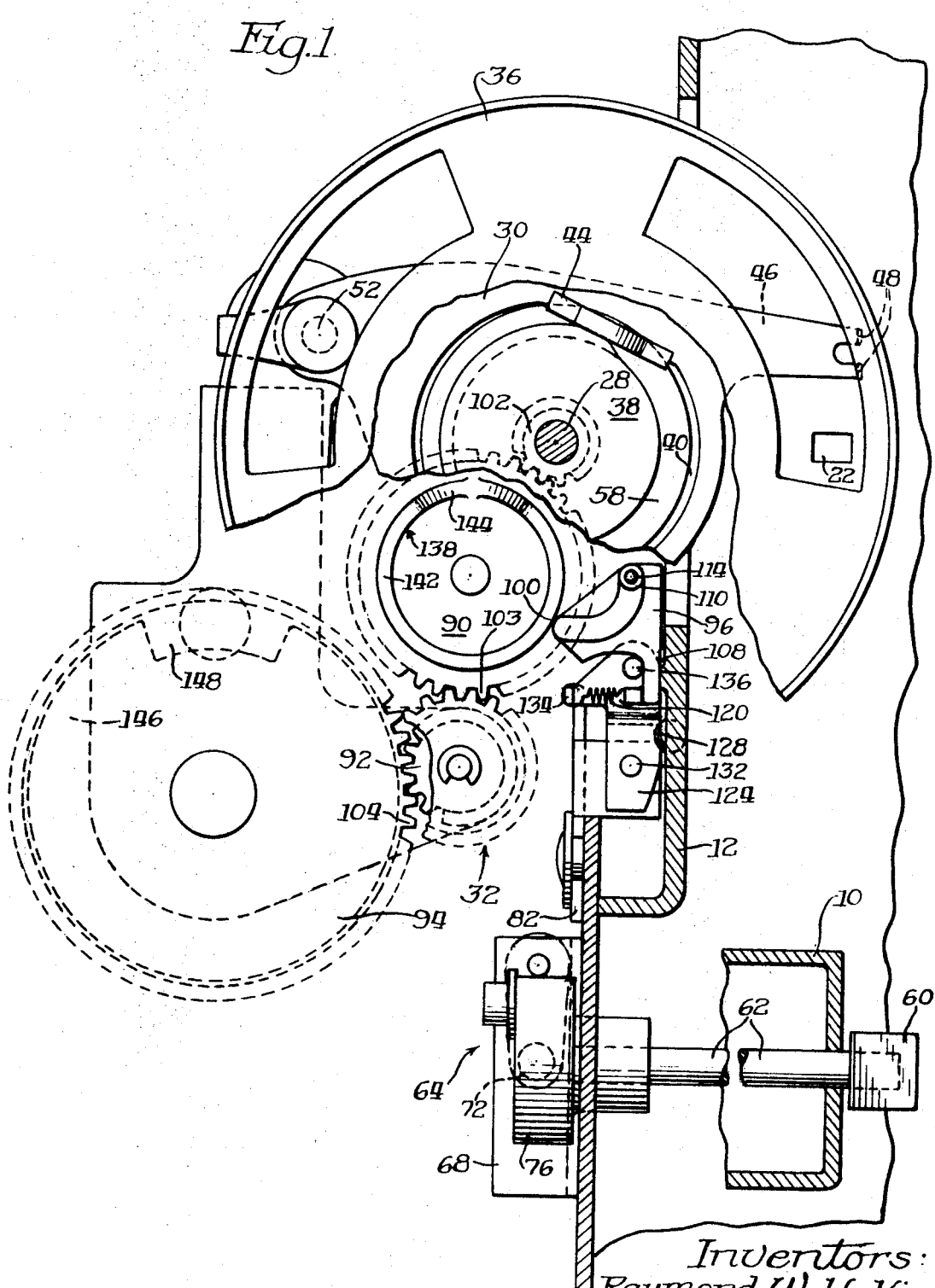

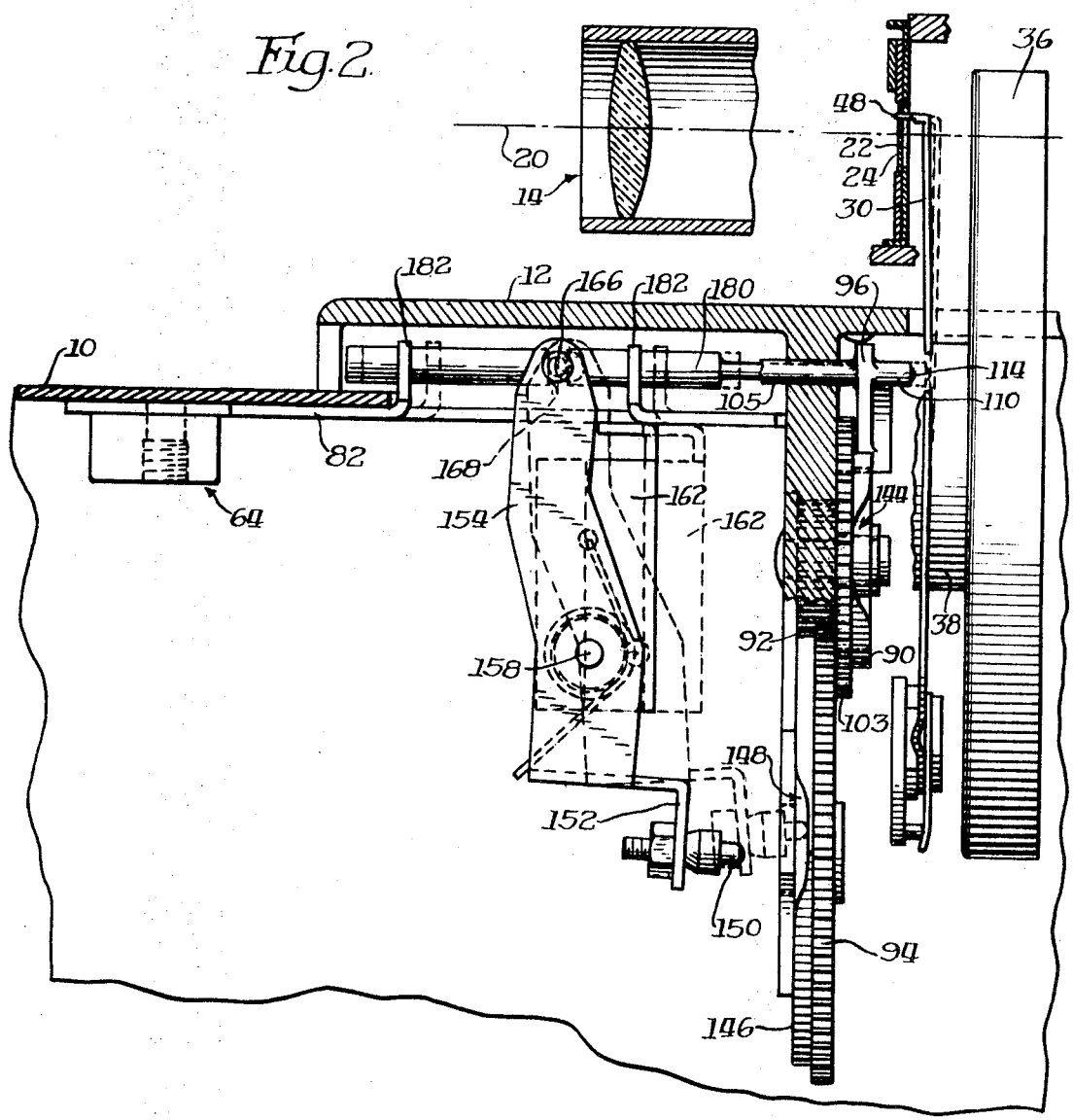

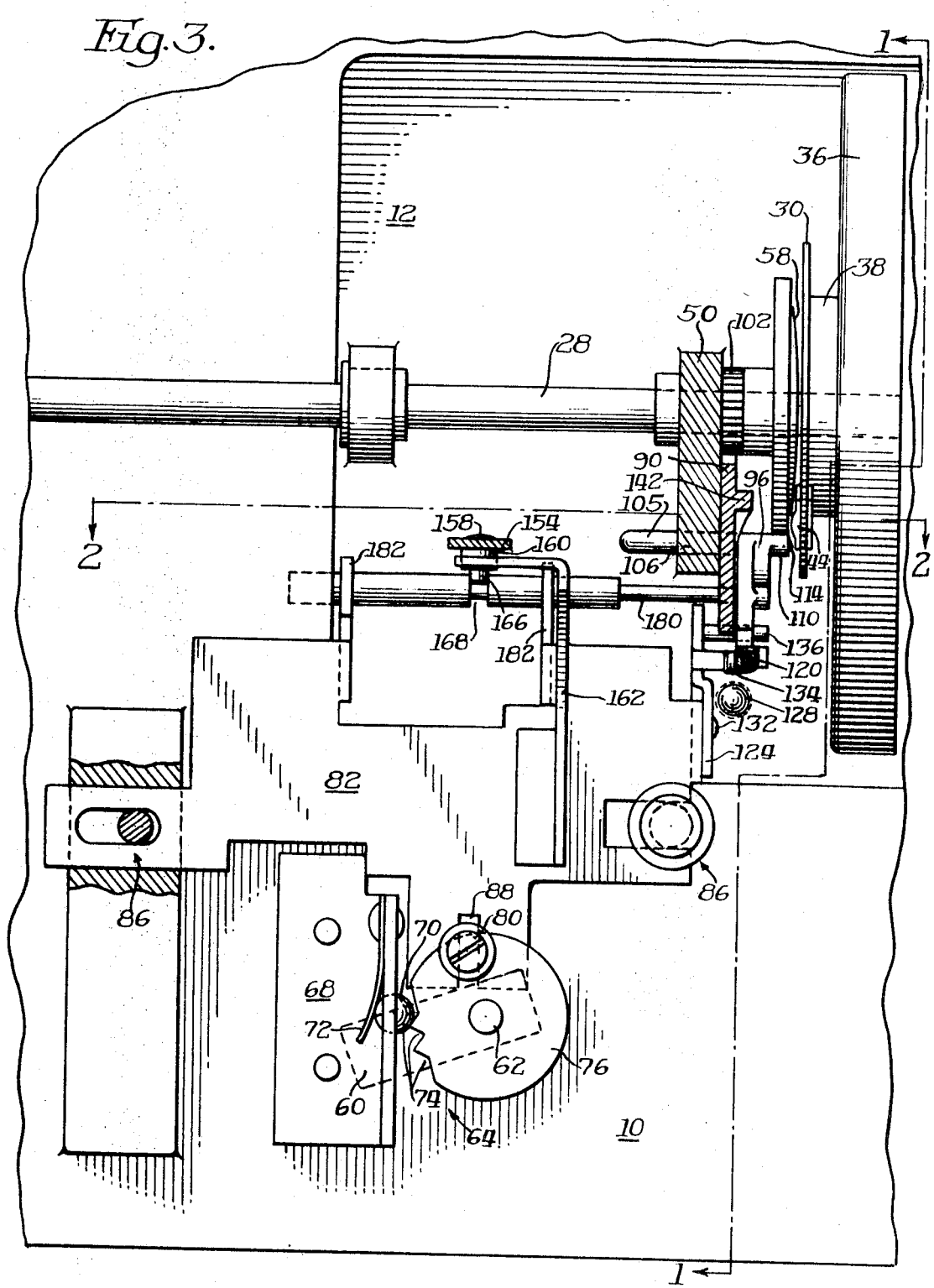

VARIABLE-SPEED FILM MOVEMENT MECHANISM

This invention relates to a film movement mechanism and more particularly to a plural-speed mechanism for moving motion picture film through the projection axis of a film-viewing apparatus at selected rates.

Apparatus for moving a motion picture film through the projection axis of a film-viewing device, such as a projector, are well known in the art. They normally comprise a shuttle means having one or more teeth adapted to engage in perforations in the film to move the film. The coaction usually occurs near the projection axis of the projector. In a typical shuttle moving in a box path, as the shuttle moves in one direction, the teeth move into perforations of the film to engage and advance the film. The teeth are then disengaged from the film. The shuttle next describes a return stroke to a point adjacent the initial start position from which teeth are moved to again engage the film for the next film movement. Usually, an in-and-out cam and an up-and-down cam cooperate to provide a single cycle for each revolution of the drive shaft to which the cams are fixedly attached.

While devices of the foregoing nature have found widespread use, their operation under varying film speed requirements have not always been entirely satisfactory. In many situations, it is desirable to vary the rate of film movement. Slow film movement is particularly desirable so that a scene of interest can be viewed in greater detail. However, because many prior art devices have their film movement means coupled to their shutter means, they have been subject to an undesirable shutter flicker when running at slow film speeds. Specifically, projectors include a shutter to prevent a projection light from projecting an image during the time the film is moved. At normal operating speeds, the shutter if fixed to the cam drive shaft to make a revolution with each revolution of the shaft. The shutter has projection axis blocking blades and operates fast enough so that no flicker is visible to the human eye. However, when the shutter movement slows down from the normal projection rate, a flicker is seen. This objectionable flicker occurs in prior art devices because of the coupling between the shutter movement and the film movement. Some prior art patents described mechanisms for solving this problem. However, this invention is a different apparatus for solving the problem.

The present mechanism has the ability to eliminate projection flicker while providing for a slow motion projection rate and a very slow or step motion projection rate without loss of illumination. The slow motion rate is desirable when a user wishes a closer investigation of the subject matter of each film frame. The time at which a frame can be viewed is a few units of time longer than is the normal projection rate. Thus, although some action is seen, the action is slowed. The very slow or step motion provides a still slower rate of film movement. At the latter rate, a film frame is projected for several units of time longer than even the slow motion time. Although the film is moved intermittently, each frame is permitted even more extensive study than during slow motion. With the mechanism described, these slow film feed rates are accomplished without the conventional losses of image brilliance present in an otherwise similar projector with equivalent light output. The light loss is precluded since additional shutter blades need not be introduced to eliminate flicker at slower rates of shutter rotation.

Therefore, it is an object of this invention to provide a new and improved film movement mechanism.

It is also an object of this invention to provide a new and improved means for moving film at variable speeds wherein no undesirable flicker occurs when the film is moved at a slower than normal rate.

It is a further object of this invention to provide a new and improved film-moving mechanism for a projector wherein the film may be moved at speeds that vary while the rate of movement of the projector shutter is kept constant.

Still further, it is an object of this invention to provide a new and improved film movement mechanism which can drive film at a normal projection rate, a slow motion projection rate, and a very slow or step motion rate without undesirable flicker occuring.

In accordance with a principle of the invention, a film movement mechanism is provided for a motion picture projector having a shutter operable at a constant rate. A shuttle is adapted to move the film through the projection axis of the projector in synchronism with rotation of the shutter. Teeth on the shuttle are moved into and out of engagement with the film perforations at speeds that are related to, but may be different from, the movement of the shutter. The mechanism includes a drive shaft having mounted thereon the shutter, adapted to move through the projection axis, and a cam operatively connected to control up-and-down movements of the shuttle and maintain synchronism with the movement of the shutter. Operatively connected to control the rate of in-and-out movements of the shuttle are a plurality of cams selectively cooperable with cam followers. The followers and cams are controllable selectively to vary the rate of engaging movement of the shuttle in response to positioning of a selector means. Hence, even though the shuttle is adapted to move in synchronism with the shutter movement, it only moves the film when the selector means adjusts the cam and followers to move the shuttle into engagement with the film. The rate of engaging movement of the shuttle may be according to the selected combination for cam and follower.

It will be appreciated by those skilled in the art and others that the invention provides a simple mechanical means for varying the rate of movement of a movie film in a projector while maintaining the movement of the projector shutter at a constant speed.

Further and other objects will be apparent from the description of the accompanying drawings in which like numerals refer to like parts:

In the drawings:

FIG. 1 is an elevational view, partially in section of the film-moving mechanism taken on a line 1–1 of FIG. 3;

FIG. 2 is a plan sectional view of the mechanism taken on line 2–2 of FIG. 3; and FIG. 3 is a side elevational view of the film-moving mechanism.

As illustrated in FIGS. 1 and 2, a motion picture projector comprises a housing generally indicated at 10. Within the housing is an intermediate vertical wall which serves as a mechanism-mounting plate 12 on which most of the film movement mechanism of the projector is supported. A projection lens 14 and projection lamp 16, shown on the right of FIG. 2, form a projection axis 20 through a projection aperture 22, past which a film 24 is fed for projection.

The film movement mechanism of the invention generally comprises a main shaft 28, a reciprocable shuttle 30, control means generally indicated at 32, and a shutter 36. The main shaft 28 serves as the support and drive for an up-and-down cam 38 and shutter 36 when that shaft is rotated through a transmission (not shown) connected to a not-shown motor. The plate-defining shuttle 30 is provided internally with a generally rectangular aperture 40 in which up-and-down cam 38 is fitted. As the cam rotates, cam follower shoes 44, 44a on shuttle plate 30 engage substantially diametrically opposite surfaces of the cam continuously to provide cyclical up and down reciprocating movement to the shuttle as viewed in FIG. 1. Shuttle 30 further is provided with an arm 46 extending across the path of film movement. The arm carries at least one film-perforation-engaging tooth 48. The opposite end of shuttle 30 is mounted pivotally upon a secondary mechanism support plate 50, and by orientation of the pivot 52 is caused to be biases so that shuttle tooth biased can engage in a film perforation 56. Also, the orientation of pivot 52 urges an in-and-out cam follower member shown as a portion of shoe 44, toward engagement with an in-and-out cam 58 which surrounds up-and-down cam 38. By coaction between the cams and shuttle 30, film 24 is caused to be moved by one frame with each cycle or revolution of up-and-down cam 38. In this embodiment, the rate of film movement provides the normal projection speed.

Also affixed to main shaft 28 is the shutter 36 having opaque blade portions which pass periodically through the projection axis of the projector. At normal operating speeds, one blade portion of the shutter blocks the projection aperture while film movement takes place, and the other blade portions serve as flicker blades with no film movement taking place while the aperture is covered. However, as hereinafter described, when the rate of film movement is slowed down, film movement occurs only when one of the shutter blades cover the aperture, and never occurs when the aperture is uncovered.

The number of in and out movements of the teeth of shuttle 30 during a given time period are selected by positioning a manually operable selector means 60. Through components oriented by the selector means in its respective positions, the effect of in-and-out cam 58 may alone be transmitted to shuttle 30 or this effect may be canceled and the shuttle actuated under the control of cams and followers described hereafter. Although the shuttle is driven by the up-and-down cam to move film at a fixed rate, if film is engaged and moved upon each cycle of that cam, film will not be fed through the projector unless the shuttle engages the film.

In this embodiment, selector means 60 is a knob located externally of projector housing 10, and supported on a shaft 62 extending through the housing to an internally located detent mechanism 64. As best seen in FIG. 3, the detent mechanism includes a seat arrangement in a shelf portion 68 mounted on mechanism plate 12. A ball 70 is positioned in the seat and biased by leaf spring 72 to cooperate with one of several detents 74. The detents are formed as a part of a bushing 76 which is fixed to shaft 62. Positioning of knob 60, as by rotation, changes the position of bushing 76 so that the ball 70 seats in another detent 74. In this embodiment, three detents are shown for cooperation at three selected rates of film movement.

Bushing 76 supports a pin 80 which engages a shiftable plate 82 which plate is adapted to relatively locate the several components of this control mechanism. The shiftable plate is supported on mechanism plate 12 by pin and slot connections 86 which connections permit reciprocation of the plate between three positions. Pin 80 engages in a cutout 88 formed in the lower end of the plate as oriented in FIG. 1, to enable shifting of the plate upon rotation of knob 60.

Components of control mechanism 32, are illustrated in FIG. 1. The components, supported by secondary mechanism support plate portion 50, include a first control cam means 90, an intermediate gear 92, a second control cam means 94, and actuator means 96, including a first cam follower portion 100 and a second cam follower 98. (See FIG. 1). Main drive shaft 28 transmits rotational drive to the cams by a pinion 102 fixed to the shaft. Teeth of pinion 102 meshes with gear teeth 103 about primary cam 90, which teeth are also in mesh with the larger radii of two radii intermediate 92 gears. The smaller radii of intermediate 92 gear. The smaller radii of intermediate gear 92 meshes with teeth 104 about second cam means 94.

By the selection of gear ratios, the drive shaft 28, the shutter 36, the up-and-down cam 38, the in-and-out cam 58 and the pinion 102 are driven at a rate to provide for normal projection mode of a film. The normal rate is usually selected to transport and project 18 frames per second in silent projectors. The drive ratio between pinion 102 and first control cam means 90 provides for rotation of the pinion three times for each revolution of that cam. As will be explained hereinafter, the single cam configuration on the first control cam means causes film 24 to be transported at a slower rate, in this embodiment, six frames per second, hereafter referred to as slow motion. The ratio of gears defining the connecting transmission between pinion 102 and secondary control cam means 94 in this embodiment, is selected to provide a yet slower film transport rate of approximately two frames per second. This very slow rate of film movement, hereafter referred to as step motion, is obtained with the single cam configuration of the cam portion of second control cam 94.

Actuator means 96 is supported for pivotal movement on secondary mechanism support plate portion 50 and for shifting or lateral movement back and forth relative thereto. Pivotal movement occurs about an extended finger 105 which extends from a body portion of the actuator, and passes with slight clearance into a hole 106 formed in the support plate portion. An aligning portion 108, formed on an edge surface of the actuator body adjacent the main mechanism mounting plate 12, provides a stop upon engagement of the actuator against the main plate when the actuator is in one of its pivoted positions. In a post 110, which extends outwardly from the body portion of the actuator, is trapped a shuttle restrainer member, shown as ball 114. In shifting of the actuator means to one lateral position the ball engages the shuttle to prevent the shuttle teeth from engaging the film perforations in response to certain cycles of in-and-out cam 58. In the other lateral position of the actuator means, the ball is ineffective to retract the shuttle. Actuator means 96 is urged into one rotational orientation by a spring means 120 and is moved back to the other rotational orientation by a speed change member 124.

Speed change member 124 is mounted pivotally to a tab portion of the shiftable plate 82, and is pivotable relative to a raised surface shown as button 128 upon movement of the shiftable plate. In a first and third orientation of the shiftable plate, the speed change member is beside the button, while in the second orientation of the plate, the member is on the button. The orientations of the speed change member relative to the button cause the opposite end of the member to pivot relative to the pivot axis defined by a stud 132 which attaches the member to the shiftable plate. A lug 134, and a small elongated limiting rod 136 extend from this end of the speed change member. Spring means 120, connected at one end to actuator means 96, is attached by the other end to lug 134 to bias the actuator means toward the speed change member. Limiting rod 136 extends into the path of movement of the actuator means to maintain a minimum spacing therebetween although the components are biased toward one another by the spring.

The alternative positions of speed change member 124 cause the member to cooperate with actuator means 96 so as to cause the member to cooperate with actuator means 96 so as to perform in an overcenter manner. In the first and third positions of member 124, limiting rod 136 holds the actuator means such that cam follower portion 100 of the actuator means is restrained away from the cam track of the primary cam 90. Thus, that gear rotates without affecting either the pivotal or lateral orientation of actuator 96. In the second position of member 124, limiting rod 136 thereon is caused to be pivoted rearward, relative to the film path, and to release the actuator so that cam follower portion 100 can be influenced by the cam track 138 of the first control cam. In this embodiment, the cam surface is a configuration including a circular rib 142 extending substantially around the periphery of the cam disc. A depression or relieved portion 144 interrupts the circular rib for a few degrees. On both ends, this relieved portion is tapered down to the plane of the disc. When cam follower portion 100 of actuator 96 is released to enter cam track 138, the follower portion can enter the track only a relieved portion 144. The follower portion, after entry, will then be lifted from the plane of the disc by the rib 142. Since the actuator is restrained against rocking action, when the follower portion thereof is lifted, the whole member is shifted transversely toward the shuttle. In this raised orientation, the shuttle restrainer member engages the shuttle and prevents the tooth 48 thereof from entering perforations of the film. Hence, actuator means 96 performs selectively as a shuttle retractor means.

The movements of shuttle tooth 48 into and out of perforations of film 24 is further controlled by the cam path 146 of second control cam means 94. The cam surface of this cam is configured with a single depression or recessed portion 148, formed below the planar surface of the operating face of this disclike member. A cam follower 150 is supported on an offset tab 152 of a carrier plate 154 which is pivotally mounted for movement about an axle 158. The axle is supported in a bearing 160 fixed in a bearing plate 162 defining a portion of shiftable plate 83 such that the carrier plate is displaced upon each displacement of the shiftable plate from a previous position. At the end of the lever arm of the carrier plate and opposite the end thereof carrying cam follower 150 is fixed a stud member 166. The free end stud this stud member is positioned in a groove 168, formed about an axially shiftable pushrod 180. The rod is loosely supported in a pair of guide holes formed in upstanding wings 182 of the shiftable plate.

One end of pushrod 180 extends into engagement with the adjacent surface of the body of actuator means 96 so as to move the actuator laterally when carrier plate 154 is pivoted about axis 158 to a first position. In this position, the shuttle restrainer member 114 of the actuator prevents shuttle tooth 48 from entering perforations of the film in response to in-and-out cam 58. Since cam follower portion 100 of actuator 96 is out of the cam track of primary cam 90, that cam is also ineffective to activate shuttle 30. Thus when recess 148 in the cam path of cam means 94 actuates cam follower to a second position the second position of the carrier plate permits the end of the rod to move slightly away from the actuator, enabling spring means 120 to pull the shuttle restrainer member away from shuttle plate 30. While the restrainer member is clear, shuttle tooth 48 can feed a frame of film.

For normal-rate projection of a film, the shuttle 30 and shutter 36 are driven by the not-shown motor through rotation of the main drive shaft 28 at a given rate. For each revolution of up-and-down cam 38, in-and-out cam 58 revolves once. Since the in-and-out cam causes the shuttle to engage film 24 on each cycle of the up-and-down cam, the film is moved with each up-and-down cycle. By the selected rate at which the up-and-down cam is rotated the film movement approximates the normal 18 frames per second rate.

Slow motion film movement is obtained when selector means 60 is rotated from the first or normal position to the second position. Through the pin and slot connection of selector means 60 with shiftable plate 82, the plate is moved to cause displacement of speed change member 124 from its first position. The member in turn, pivots actuator means 96 so as to enable the cam follower portion thereof to ride in the cam track 138 of first control cam 90. If the relieved portion 144 of the cam track is not available for entry of the follower portion 100 immediately, that portion rides temporarily against the edge of rib 142 under the biasing of spring 120, until the relieved portion appears. Since the follower portion of the actuator rests against the planar surface of the cam, the spring can urge that portion into the cam track upon the passing of the relieved portion.

Primary control cam means 90 is rotated in geared relation with the drive shaft 28 and up-and-down cam 38. By the selection of the gear ratio and cam track dimensions actuator means 96 rides rib 142 of the cam during tow up-and-down cycles, and rides through relieved portion 144 during the third up-and-down cycle. In the raised condition, shuttle restrainer member 114 prevents shuttle tooth 48 from engaging the film. However, in the lowered condition, the shuttle is released to engage and move the film. Thus, since units of time are determined by the up-and-down cam rate and the film is moved only on every third of the cycles of that cam, the film is moved at one-third the normal rate.

Step motion is obtained by adjusting selector means 60 to the third position. The rotation of the selector moves the shiftable plate 82 to the third position. The speed change member 124, supported pivotally on the plate, is moved off of the button and withdraws actuator means 96 from the cam track 138 of first control cam 90, if slow motion was the last previous operational mode. If normal projection was the last mode, the actuator is temporarily released, and recaptured by the limiting rod 136 to locate the follower portion of the actuator against the planar surface of the cam disc but outside of the cam track.

The positioning of the shiftable plate further locates cam follower 150 against the cam path 146 of second control cam 94. As the cam is rotated the follower periodically is permitted to move inwardly of the operating face as recess portion 148 passes. The drive ratio for this cam is selected in this embodiment so that the recess is encountered once every eight frames or at a rate of approximately two frames per second. When the cam follower permits carrier plate 154 to pivot about axle 158, stud member 166 retracts pushrod 180 to release actuator means 96 from shuttle 30 such that shuttle tooth 48 may engage the film. As the end of recess portion 148 approaches the follower, the pushrod is again pushed forward to retract the shuttle until another cycle of the cam path is completed.

From the aforegoing description, the selector means 60 is seen to be adjustable between either of the positions to alter the projection mode of the projector.

Although the invention has been described with respect to the mechanism operating to feed film in a forward direction, it is to be understood that the mechanism functions in substantially the same manner for reverse projection of a film.

What we claim is:

1. Apparatus for moving a motion picture film past an aperture in a film-viewing device comprising:
   a main shaft adapted to be revolved at a predetermined speed;
   a shuttle having tooth means adapted to move into and out of engagement with perforations in said film for moving said film;
   first cam means mounted on said shaft and adapted to operatively coact with said shuttle to reciprocate said shuttle in the direction of film movement at the rate of revolution of said shaft, the distance of movement of said tooth means being equal to the distance necessary to move one frame of said film past said aperture;
   control means operatively arranged for causing engaging and disengaging movement of said shuttle, said control means including:
   control cam means operative to revolve at a speed different from said main shaft and having a cam track including a control configuration;
   actuator means movable selectively into and out of cooperation with said cam track;
   shuttle restraining means coacting with said actuator means to restrain engagement of said shuttle tooth with said film when said actuator means responds during selected portions of a revolution of said cam track of said control cam means.

2. Apparatus as claimed in claim 1 wherein said control configuration of said means is a rib means, and said actuator means includes a cam follower portion adapted to ride on said rib means to actuate said shuttle-restraining means into shuttle-retracting mode, said shuttle-restraining means releasing said shuttle to engage the film during the remainder of the cycle of said cam means.

3. Apparatus as claimed in claim 1 further comprising second cam means coacting with said actuator means to release said shuttle-restraining means at predetermined times relative to the cycle of said drive shaft.

4. Apparatus as claimed in claim 1 further comprising an in-and-out cam means coacting with said drive shaft and said up-and-down cam to cause said shuttle to feed frame of film with each cycle of said up-and-down cam, and wherein said control cam means coacting with said shuttle intermittently restricts coaction of said shuttle with said in-and-out cam means.

5. Apparatus as claimed in claim 1 wherein said control cam means is a first control cam means; and said control means further comprises a second control cam means operative at a rate different from said first control cam means and said up-and-down cam means; and wherein said film restrainer means coacts with said control cams for selective control of said shuttle means.

6. Apparatus for moving a motion picture film past an aperture in a film-viewing device comprising:
a main shaft adapted to be revolved at a predetermined speed;
a shuttle having tooth means adapted to move into and out of engagement with perforations in said film for moving said film;
up-and-down cam means mounted on said shaft and adapted to operatively coact with said shuttle to reciprocate said shuttle in the direction of film movement at the rate of revolution of said shaft;
in-and-out cam means coacting with said up-and-down cam means and said shuttle means to cause said shuttle means to move film on each revolution of said up-and-down cam means; and control means including;
first control cam means operatively connected with said main shaft and operative to move at a speed slower than said main shaft, said control cam means having a cam configuration thereon;
second control cam means operatively connected with said main shaft and operative to move at a speed slower than said main shaft and said first control cam means, said second control cam means having a cam configuration thereon;
actuator means including shuttle restrainer means being adapted to coact with said first control cam means and said second control cam means;
shiftable plate means; and
selector means operatively adjustable into selected positions and arranged with said shiftable plate means to displace said plate means to a selected position for each position of said selector means
whereby in one selected position of said selector means, said in-and-out cam is deactivated and said first cam control means is activated to permit said shuttle to feed film at a first rate different from said in-and-out cam in a second selected position, said in-and-out cam is deactivated and said second cam control means is activated to permit said shuttle to feed film at a second rate different from said in-and-out cam.

7. Apparatus as claimed in claim 6 wherein a carrier plate means is supported on said shiftable plate means; and a cam follower is mounted on said carrier plate means and being adapted to engage said second control cam means in one position of said shiftable plate; and a pushrod coacting with said cam follower to control said shuttle-restrainng member in response to said configuration on said second control cam.

8. Apparatus as in claim 6 wherein said actuator means includes a cam follower portion adapted to engage said first control cam means when said selector means is in a selected position.

9. Apparatus as in claim 6 wherein a carrier plate means is supported on said shiftable plate means; and a cam follower is mounted on said carrier plate means and being adapted to engage said second control cam means in one position of said shiftable plate; and a pushrod coacting with said cam follower to control said shuttle-restraining member in response to said configuration on said second control cam; said actuator means includes a cam follower portion adapted to engage said first control cam means when said selector means is in a selected position; and to disengage said cam follower adapted to coact with said second control cam.

10. Apparatus as in claim 9 wherein said selector means in another selected position disengages said cam follower portion from coaction with said first control cam means, and engages said cam follower coacting with said second control cam means.

11. Apparatus as in claim 10 wherein said selector means in a third selected position disengages said cam follower portion and said cam follower from said first and second control cam means.

12. Apparatus for moving a motion picture film past an aperture in a film-viewing device comprising:
a main shaft adapted to be revolved at a predetermined speed;
a shuttle having tooth means adapted to move into and out of engagement with perforations in said film for moving said film;
up-and-down cam means mounted on said shaft and adapted to operatively coact with said shuttle to reciprocate said shuttle in the direction of film movement at the rate of revolution of said shaft;
in-and-out cam means coacting with said up-and-down cam means and said shuttle means to cause said shuttle means to move film on each revolution of said up-and-down cam means; and
control means including:
first control cam means operatively connected with said main shaft and operative to move at a speed slower than said main shaft, said control cam means having a cam configuration thereon;
second control cam means operatively connected with said main shaft and operative to move at a speed slower than said main shaft and said first control cam means, said second control cam means having a cam configuration thereon.

UNITED STATES PATENT OFFICE
CERTIFICATE OF CORRECTION

PAGE 1

Patent No. 3,592,373                    Dated July 13, 1971

Inventor(s) Raymond W. H. Kim and Arthur E. Nupnau

It is certified that error appears in the above-identified patent and that said Letters Patent are hereby corrected as shown below:

Column 8, Line 25, Claim 12 should read as follows:

Apparatus for moving a motion picture film past an aperture in a film viewing device comprising:
    a main shaft adapted to be revolved at a predetermined speed;
    a shuttle having tooth means adapted to move into and out of engagement with perforations in said film for moving said film;
    up-and-down cam means mounted on said shaft and adapted to operatively coact with said shuttle to reciprocate said shuttle in the direction of film movement at the rate of revolution of said shaft;
    in-and-out cam means coacting with said up-and-down cam means and said shuttle means to cause said shuttle means to move film on each revolution of said up-and-down cam means; and
    control means including:
    first control cam means operatively connected with said main shaft and operative to move at a speed slower than said main shaft, said control cam means having a cam configuration thereon;
    second control cam means operatively connected with said main shaft and operative to move at a speed slower than said main shaft and said first control cam means, said second control cam means having a cam configuration thereon;
    actuator means including shuttle restrainer means being adapted to coact with said first control cam means and (CONTINUED PAGE 2)

UNITED STATES PATENT OFFICE
CERTIFICATE OF CORRECTION

PAGE 2

Patent No. 3,592,373  Dated July 13, 1971

Inventor(s) Raymond W. H. Kim and Arthur E. Nupnau

It is certified that error appears in the above-identified patent and that said Letters Patent are hereby corrected as shown below:

(CONTINUED FROM PAGE 1)

said second control cam means;
> shiftable plate means;
> a speed changer member supported on said shiftable plate means and coacting with a displacement member upon shifting of the plate means for orientation of said speed changer member;
> a limiting rod on said speed changer member coacting with said actuator to deactivate said shuttle restrainer means for effecting said shuttle means when said speed changer member is in selected orientations; and
> selector means operatively adjustable into selected positions and arranged with said shiftable plate means to displace said plate means to a selected position for each position of said selector means whereby in one selected position of said selector means, said in-and-out cam is deactivated and said first cam control means is activated to permit said shuttle to feed film at a first rate different from said in-and-out cam, in a second selected position, said in-and-out cam is deactivated and said second cam control means is activated to permit said shuttle to feed film at a second rate different from said in-and-out cam, and in a third selected position said in-and-out cam is activated and said first and second control cam means are deactivated.

Signed and sealed this 6th day of June 1972.

(SEAL)
Attest:

EDWARD M. FLETCHER, JR.
Attesting Officer

ROBERT GOTTSCHALK
Commissioner of Patents